US012754564B2

(12) United States Patent
Viereck et al.

(10) Patent No.: US 12,754,564 B2
(45) Date of Patent: Oct. 6, 2026

(54) TRANSPORT ROBOT AND METHOD AND SYSTEM FOR OPERATING A TRANSPORT ROBOT IN A WAREHOUSE

(71) Applicant: STILL GmbH, Hamburg (DE)

(72) Inventors: Volker Viereck, Kühsen (DE); Tino Krueger-Basjmeleh, Halstenbek (DE)

(73) Assignee: STILL GmbH, Hamburg (DE)

( * ) Notice: Subject to any disclaimer, the term of this patent is extended or adjusted under 35 U.S.C. 154(b) by 0 days.

(21) Appl. No.: 18/970,563

(22) Filed: Dec. 5, 2024

(65) Prior Publication Data

US 2025/0189982 A1 Jun. 12, 2025

(30) Foreign Application Priority Data

Dec. 6, 2023 (DE) ..................... 10 2023 134 149.9

(51) Int. Cl.

| | |
|---|---|
| ***G05D 1/644*** | (2024.01) |
| ***G05D 1/229*** | (2024.01) |
| ***G05D 101/00*** | (2024.01) |
| ***G05D 105/28*** | (2024.01) |
| ***G05D 107/70*** | (2024.01) |
| ***G05D 111/10*** | (2024.01) |
| ***G06Q 10/08*** | (2024.01) |

(52) U.S. Cl.

CPC ............. *G05D 1/644* (2024.01); *G05D 1/229* (2024.01); *G06Q 10/08* (2013.01); *G05D 2101/22* (2024.01); *G05D 2105/28* (2024.01); *G05D 2107/70* (2024.01); *G05D 2111/10* (2024.01)

(58) Field of Classification Search

CPC ...................................................... G06Q 10/08

See application file for complete search history.

(56) References Cited

U.S. PATENT DOCUMENTS

2023/0419467 A1* 12/2023 Rice ......................... B25J 11/00
2026/0021998 A1* 1/2026 Ulbrich ................... B66F 9/063

FOREIGN PATENT DOCUMENTS

DE 102004053183 A1 5/2006
DE 102021006476 A1 6/2023

OTHER PUBLICATIONS

Rafflin et al., Learning with a Friendly Interactive Robot for Service Tasks in Hospital Environments, Aug. 5, 1995, pp. 492-497, Universite Montpellier II.

* cited by examiner

*Primary Examiner* — Imran K Mustafa
(74) *Attorney, Agent, or Firm* — The Webb Law Firm

(57) ABSTRACT

A transport robot is used to carry out transport orders for transport of goods in a warehouse with a plurality of transport robots. The transport robot includes a communication interface configured to receive an environment model of the warehouse and a capability model of the plurality of transport robots. The environment model defines a plurality of key points of the warehouse and, for each key point, at least one neighboring key point. The capability model defines, for each of the key points of the environment model, movement sequence data for an automated movement to the at least one neighboring key point. The transport robot includes a control unit configured to carry out a transport order from a starting key point to a destination key point of the plurality of key points to automatically control movement of the transport robot based on the environment model and the capability model.

10 Claims, 8 Drawing Sheets

TRANSPORT ROBOT AND METHOD AND SYSTEM FOR OPERATING A TRANSPORT ROBOT IN A WAREHOUSE

CROSS-REFERENCE TO RELATED APPLICATION

This application claims priority to German Patent Application No. 10 2023 134 149.9 filed Dec. 6, 2023, the disclosure of which is hereby incorporated by reference in its entirety.

BACKGROUND OF THE INVENTION

Field of the Invention

This invention relates to a transport robot and a method and system for operating such a transport robot in a warehouse.

Description of Related Art

Load carriers such as mesh boxes or pallets, in particular Europallets, are frequently used for the transport and storage of products, goods and materials. Industrial trucks such as forklift trucks, for example, transport robots etc. are used for the handling of such load carriers, for example in intralogistics operations, i.e. the internal flow of materials, e.g. in a warehouse. A warehouse is generally a highly dynamic environment in which the control of the mobile industrial trucks is generally either manual, semi-automated or automated.

In intralogistics operations, strong growth in connection with demographic changes is creating a demand for automated solutions. However, the introduction of new, more complex digital technologies is complicated by the fact that employees with a high level of personal qualifications are frequently under-represented in the area of intralogistics operations.

Current automation solutions for the transport of general cargo in intralogistics operations are essentially based on continuous conveyors, storage and retrieval units and driverless transport systems (FTS). Continuous conveyors and storage and retrieval units are ostensibly used everywhere rigid process chains and high material throughput rates are required, while driverless transport systems offer greater opportunities for use in intralogistics operations.

The causes of the somewhat hesitant pace of the introduction of current automation solutions include the high investment costs connected with current automation solutions, as well as the increased amount of space required and frequently the infrastructure already in place for manual processes. Automated solutions such as driverless transport systems (FTS) are also operated on pre-defined routes for transport. When adjustments to the transport layout are made, these routes must be re-planned, which results in a reduced degree of flexibility.

Therefore, for a plurality of additional potential areas of application where greater flexibility is required there are either no economical solutions or the current technical solutions entail high re-planning costs on account of their dynamics of change. Consequently, current automation solutions are only a niche product compared to manually-oriented transport solutions.

Autonomous Mobile Robots (AMRs), e.g. in the form of transport robots, are characterized by greater flexibility than FTS (driverless Transport Systems). However, AMRs that move in a plurality of open environments and perform a plurality of tasks and interactions require explicit capabilities to be able to perform their tasks. AMRs interact with their environment in a sensorimotor manner and must act consciously to perform their task. In this context, conscious action means that the AMRs perform tasks that are motivated by specified goals and are justified and/or optimal for these goals by considerations that are dependent on environmental models. These deliberative capabilities are a characteristic of AMRs compared to FTS.

However, for automated transport by AMRs, in particular transport robots, the knowledge for the creation of the routes, navigation maps and subsequent actions (e.g. retrieving and depositing loads, waiting, loading etc.) must be transmitted to the AMRs. The transmission of this knowledge requires interventions by highly specialized technical personnel for the adaptation of the AMRs to their subsequent use. This makes up the greatest portion of the commissioning and adaptation work and limits the fields of action on account of the related costs and human resources required.

However, the knowledge of the routes and the corresponding handling locations in a warehouse is in the form of knowledge of the warehouse and application. The warehouse employees are precisely the people who have a great deal of application knowledge which, if it were made available to the machines, could be used as the basis of the performance of the tasks of industrial trucks configured as AMRs.

SUMMARY OF THE INVENTION

Against this background, the object of the present invention is to make available an improved transport robot and a method and system for the commissioning, adaptation and operation of a transport robot of this type in a warehouse.

This object is accomplished according to a first aspect by a transport robot for operation in a warehouse. The transport robot can be an industrial truck, in particular a forklift truck. The transport robot, the operation of which can be fully automated, semi-automated and/or manual, is configured to carry out transport orders for the transport of goods in a warehouse with a plurality of transport robots. The transport robot thereby comprises a communication interface, for example a communication interface for wireless communication via a wireless communication network, wherein the communication interface is configured to receive and/or send an environment model of the warehouse and a capability model of the plurality of transport robots in the warehouse. In one embodiment, the communication interface of the transport robot is configured to obtain the environment model of the warehouse and the capability model of the plurality of transport robots in the warehouse from a central device, for example a server for the operation of the plurality of transport robots. The transport robot can also receive transport orders from the central device. In an additional embodiment, the communication interface of the transport robot is configured to obtain the environment model of the warehouse and the capability model of the plurality of transport robots in the warehouse from another transport robot of the plurality of transport robots.

According to the invention, the environment model of the warehouse defines a plurality of unambiguous key points (including in the form of semantic key points or nodes) of the warehouse in the form of a topological map in which each key point has at least one neighboring key point, i.e. connected by means of an edge of the topological map. The capability model of the plurality of transport robots defines or comprises, for each of the key points of the environment model, i.e. of the topological map, movement sequence data, in particular at least one trajectory, for an automated movement from the corresponding key point to the at least one neighboring key point. In other words, the capability model with the movement sequence data, in particular trajectories, for each key point of the environment model enables the transport robot to connect neighboring key points of the environment model with one another.

According to the invention, the transport robot also comprises a control unit to carry out the transport order from the starting key point to the destination key point of the plurality of key points that can be configured to automatically control the movement of the transport robot on the basis of the environment model and first movement sequence data, in particular of a first trajectory, and at least second movement sequence data, in particular of at least a second trajectory, of the capability model, wherein the first movement sequence data, in particular the first trajectory, defines a movement from the starting key point to an intermediate key point neighboring the starting key point and wherein the at least second movement sequence data, in particular the at least one second trajectory, defines a movement from the intermediate key point to the destination key point or a movement from the intermediate key point to an additional intermediate key point neighboring the intermediate key point.

In one embodiment, the control unit is further configured, after the movement of the industrial truck from the starting key point to the intermediate key point, which is done on the basis of the first movement sequence data, in particular of the first trajectory, to determine a cumulative deviation of a current position or current pose from a specified position or specified pose of the transport robot relative to the intermediate key point and to vary the movement of the transport robot from the intermediate key point to the destination key point or the additional neighboring intermediate key point on the basis of the second movement sequence data, in particular the at least one second trajectory, to counteract the deviation.

In one embodiment, for each key point of the plurality of key points of the environment model, the movement information, in particular the at least one trajectory, of the capability model is based on at least one movement learned by imitation learning of a transport robot operated manually of the plurality of transport robots between the key point and the at least one neighboring key point. According to this embodiment, therefore, the expert knowledge or know-how required for the automatic operation of the transport robot is transmitted to the transport robot as imitation knowledge in the form of the capability model.

According to one embodiment, the control unit can further be configured, by means of a cost function, to determine the movement of the transport robot from the starting key point to the destination key point via the one or more intermediate key points lying between them.

According to one embodiment, each key point of the plurality of key points can have an artificial marking (such as a marker, for example), and the transport robot can further have a sensor unit which is configured to detect the marking of a respective key point and to identify the respective key point on the basis of the marking detected.

In one embodiment, the control unit of the transport robot is configured, on the basis of the artificial marking detected by the sensor unit of a respective key point to determine the position, in particular the pose, of the transport robot relative to the respective key point.

According to one embodiment, the marking of the respective key point can be a visual marking and the sensor unit of the transport robot can be in the form of a camera, in particular a depth sensing camera for the detection of the visual marking of the respective key point.

In one embodiment, the transport robot further comprises a drive unit which is configured to drive the movement of the transport robot on the basis of movement control signals from the control unit. The drive unit can comprise, for example, a plurality of drive wheels and an electric drive motor to drive the plurality of drive wheels.

According to a second aspect, the above-mentioned task is accomplished by a system for the operation of a plurality of transport robots in a warehouse. The system thereby comprises a plurality of transport robots according to the first aspect of the invention and a central device for the operation of the plurality of transport robots in the warehouse, wherein the central device is configured to make available to each transport robot of the plurality of transport robots the environment model of the warehouse and the capability model of the plurality of transport robots.

According to a third aspect, the above-mentioned object is accomplished by a method for the operation of a transport robot, in particular an industrial truck, the operation of which can be automated, semi-automated and/or manual, to carry out transport orders for the transport of goods in a warehouse with a plurality of transport robots. The method thereby comprises the following steps:

Obtaining an environment model of the warehouse and a capability model of the plurality of transport robots in the warehouse (optionally from a central device for the operation of the plurality of transport robots), whereby the environment model of the warehouse defines a plurality of key points of the warehouse and for each key point at least one neighboring key point, and wherein the capability model defines for each of the key points of the environment model movement sequence data, in particular at least one trajectory, for an automated movement to the at least one neighboring key point; and Control of the movement of the transport robot, to carry out a transport order from a starting key point to a destination key point of the plurality of key points on the basis of the environment model and first movement sequence data, in particular of a first trajectory, and at least second movement sequence data, in particular of at least a second trajectory, of the capability model, wherein the first movement sequence data, in particular the first trajectory, defines a movement from the starting key point to an intermediate key point neighboring the starting key point and wherein the at least second movement sequence data, in particular the at least one second trajectory, defines a movement from the intermediate key point to the destination key point or a movement from the intermediate key point to an additional intermediate key point neighboring the intermediate key point.

BRIEF DESCRIPTION OF THE DRAWINGS

The terms Fig., Figs., Figure, and Figures are used interchangeably in the specification to refer to the corresponding figures in the drawings.

Additional advantages and details of the invention are further explained by way of example on the basis of the exemplary embodiments illustrated in the accompanying schematic figures, in which.

DESCRIPTION OF THE INVENTION

Figure 1:
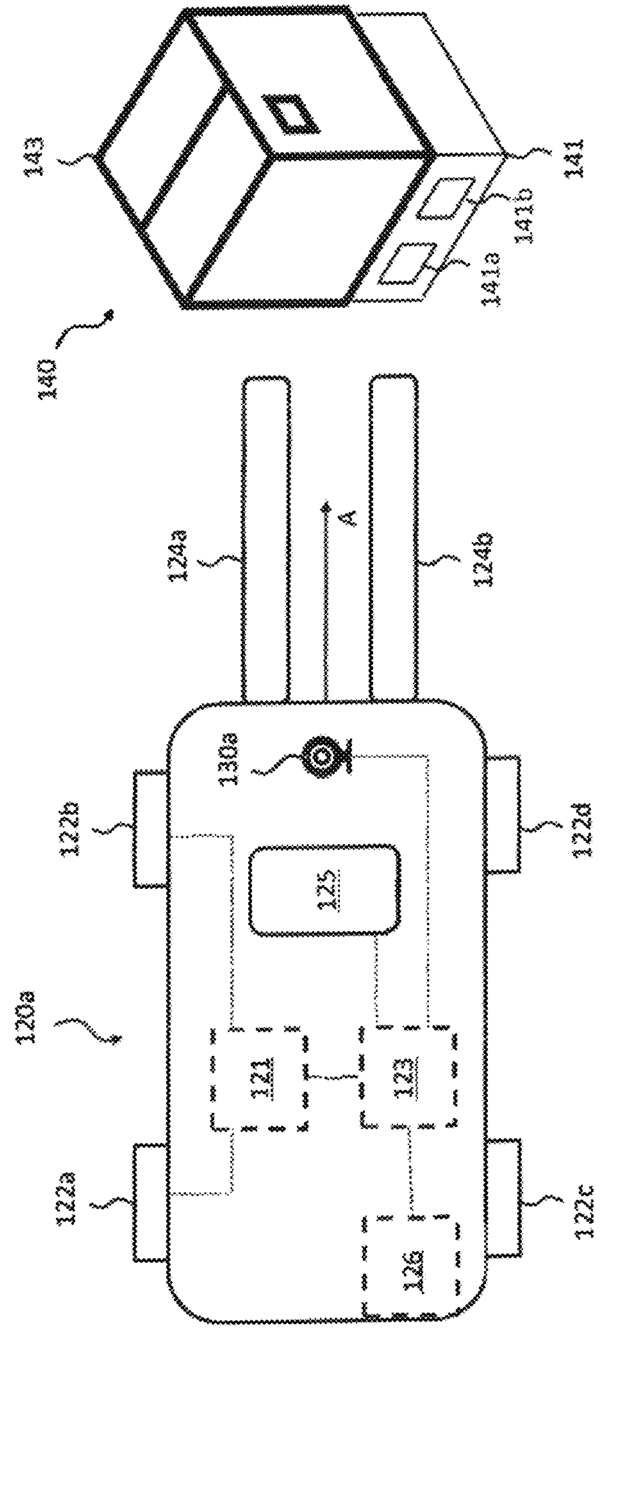
FIG. 1 is a schematic illustration of a transport robot in the form of an industrial truck for the transport of goods in a warehouse according to one embodiment.

FIG. 1 shows a schematic illustration of a transport robot 120*a* configured as an industrial truck in the form of a forklift truck 120*a* according to one embodiment for the transport of goods 140 in an industrial environment, in particular a warehouse. The transport robot 120*a* configured as an industrial truck can be in particular an intermittently autonomous, semi-autonomous and/or manually operated forklift truck 120*a*, i.e. one guided by an operator. The goods 140 can be, for example, inventory items 143, such as packing boxes 143 that are located on a respective load carrier 141. The load carrier 141 can be, for example, a pallet 141, in particular a Europallet 141 or a mesh box 141.

As shown in FIG. 1, the transport robot 120*a* configured as an industrial truck comprises load handling means in the form of a pair of load forks 124*a,b* which are configured to be inserted into respective recesses, in particular pockets 141*a,b* on one end side of the load carrier 141, to accept the load carrier 141 and the item 143 located on it. According to additional embodiments, the load handling means can also be configured in the form of a spike, for example to accept rolls of film or coils of wire, as interlinking load handling means (e.g. comparable to waste hauling trucks for the pickup of waste bins) or in the form of bale or roll clamps, for example to pick up rolls of paper.

The transport robot 120*a* configured as an industrial truck 120 illustrated in FIG. 1 comprises a drive unit 121, for example at least one motor 121, in particular an electric motor 121, wherein the drive unit 121 is configured to move the industrial truck 120*a* and the pair of load forks 124*a,b* relative to the item 140, for example to modify the orientation and/or the distance between the industrial truck 120*a* and the item 140 and/or to raise and lower the pair of load forks 124*a,b*. For this purpose, as indicated in FIG. 1, the drive unit 121 is appropriately connected with wheels 122*a-d* and/or the pair of load forks 124*a,b* of the industrial truck 120*a.*

The transport robot 120*a* in the form of an industrial truck 120*a* can also comprise a sensor unit 130*a*, in particular an image acquisition unit 130*a*, which is configured to acquire, during the movement of the transport robot 120*a*, a plurality of images of the environment of the industrial truck 120*a*. The image acquisition unit 130*a* preferably comprises a camera 130*a*, in particular a depth sensing camera 130*a*. As indicated in FIG. 1, the image acquisition unit 130*a* is preferably mounted on the transport robot 120*a* in the form of an industrial truck 120*a* so that the field of view of the image acquisition device 130*a* lies essentially along a direction A of forward movement of the transport robot 120*a*. The image acquisition device 130*a* can preferably be mounted in the plane of symmetry between the two load forks 124*a,b*. In addition to the image acquisition device 130*a* with the field of view along the direction A of forward movement of the transport robot 120*a*, the transport robot 120*a* in the form of an industrial truck 120*a* can comprise additional image acquisition devices or sensor units, for example an image acquisition device with a field of view along a direction of reverse movement of the transport robot 120*a* and/or an image acquisition device with a field of view perpendicular to the direction A of forward movement of the transport robot 120*a.*

According to the invention, the transport robot 120*a* in the form of an industrial truck 120*a* further comprises a control unit 123 which can comprise, for example, one or more processors or micro-controllers with appropriate software which can control the transport robot 120*a* in the form of an industrial truck 120*a* in an at least semi-automated manner, as described in greater detail below.

Figure 2:
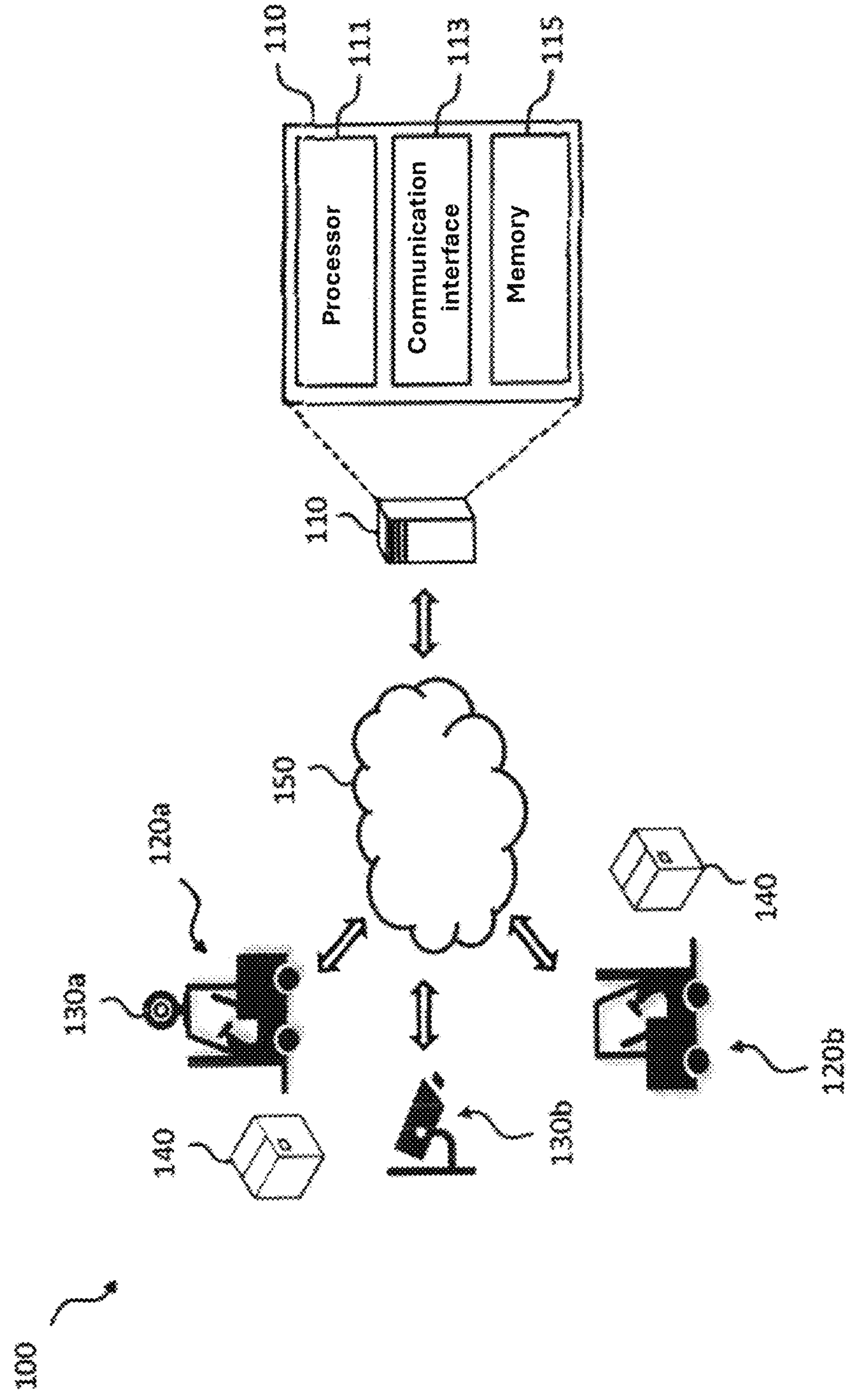
FIG. 2 is a schematic illustration of a system according to the invention with a plurality of transport robots in the form of industrial trucks and a central device for the provision of an environment model and of a capability model for the operation of the plurality of transport robots.

FIG. 2 is a schematic illustration of a system 100 according to the invention for the operation of the transport robot 120*a* in the form of an industrial truck 120*a* and at least one additional transport robot 120*b* in the form of an industrial truck 120*b*, each of which can be operated in an automated, semi-automated and/or manual mode, to carry out transport orders for the transport of goods 140 in a warehouse.

The system 100 comprises, in addition to the plurality of transport robots 120*a,b*, a central management device 110 such as a server 110, for example, which is configured to communicate with each transport robot 120*a,b* of the plurality of transport robots 120*a,b*, and to transmit to each of the plurality of transport robots 120*a,b*, for example, transport orders for the transport of goods 140 in the warehouse. For this purpose, for example, the transport robot 120*a* in the form of an industrial truck comprises a communication interface 126 which is configured to communicate with a corresponding communication interface 113 of the central management device 110 and with an external sensor unit 130*b*, such as, for example, a sensor unit 130*b* of the warehouse, for example via a wireless communication network 150, e.g. a wi-fi network or a mobile radio or cellular telephone network. The central management device 110 illustrated in FIG. 2 can be, for example, an industrial PC 110 or a cloud server, in particular an edge cloud server 110.

As shown in FIG. 2, the central management device 110, in addition to the above-mentioned communication interface 113, can have one or more processors 111 and a memory 115, in particular a non-volatile memory 115. The memory 115 can be configured, for example, to store data and executable program code which, when executed by the processor 111 of the central management device 110, causes the processor 111 to execute the functions, operations and processes described below.

Figure 3A:
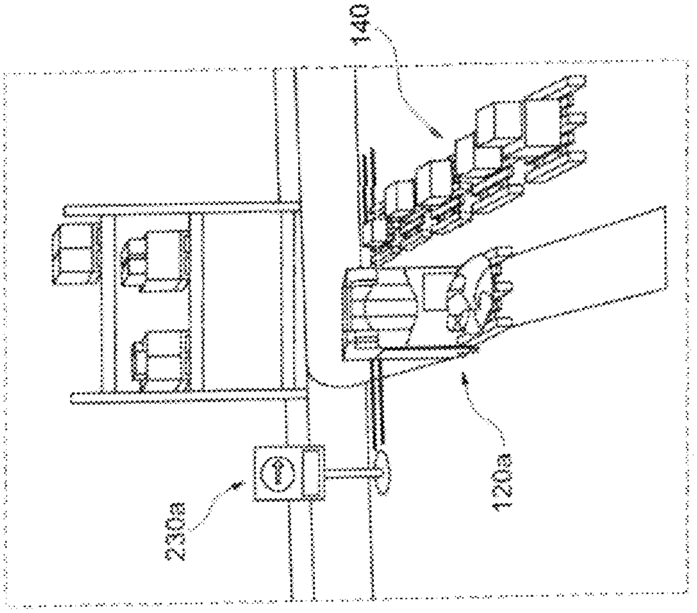
FIG. 3*a* is an illustration of a transport robot according to one embodiment in a warehouse shown by way of example with a key point in the form of a branch.
Figure 3B:
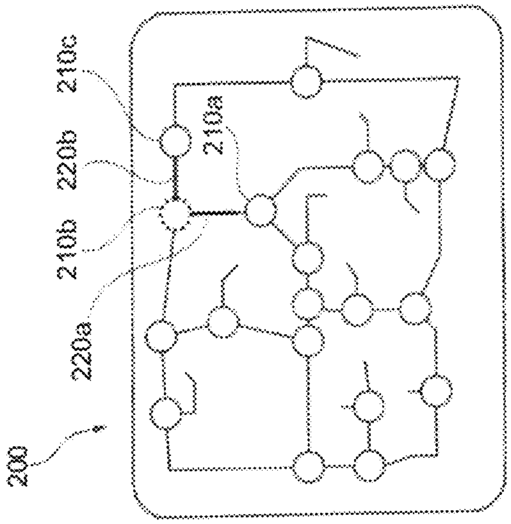
FIG. 3*b* is an illustration of an environment model of the warehouse in FIG. 3*a;*
Figure 3C:
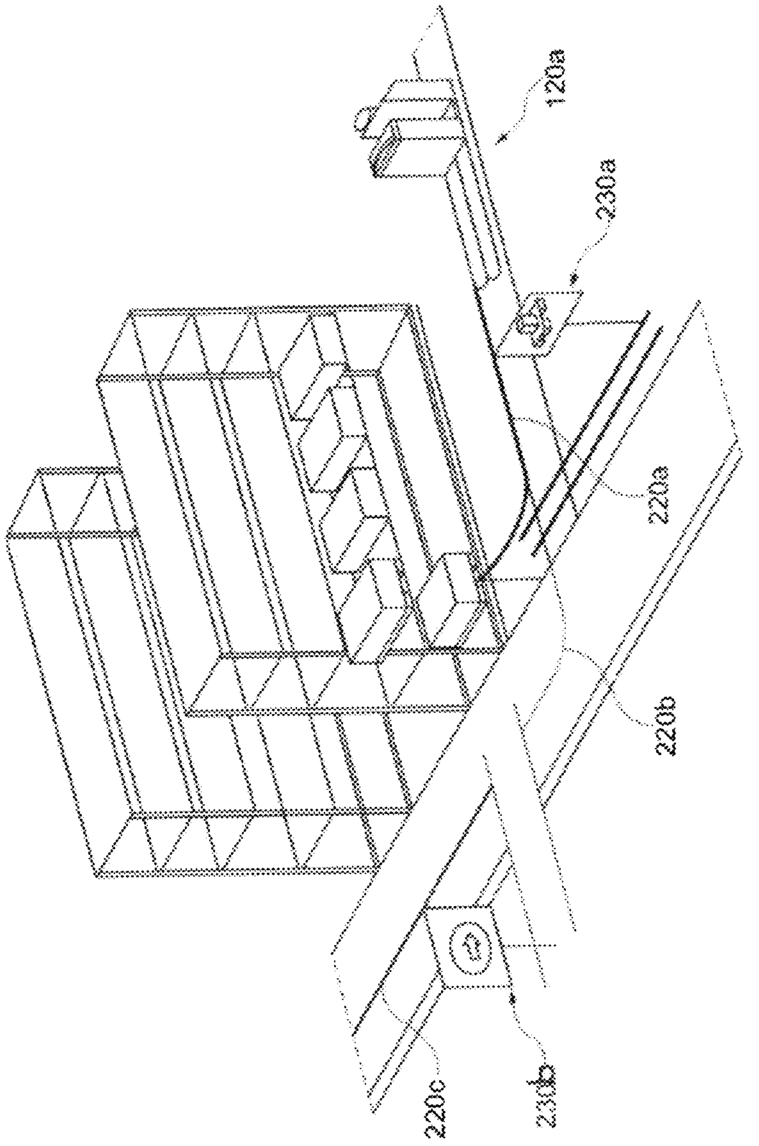
FIG. 3*c* is an illustration of a transport robot according to one embodiment in a warehouse shown by way of example with two neighboring key points and the automated movement of the transport robot on the basis of the capability model.
Figure 3D:
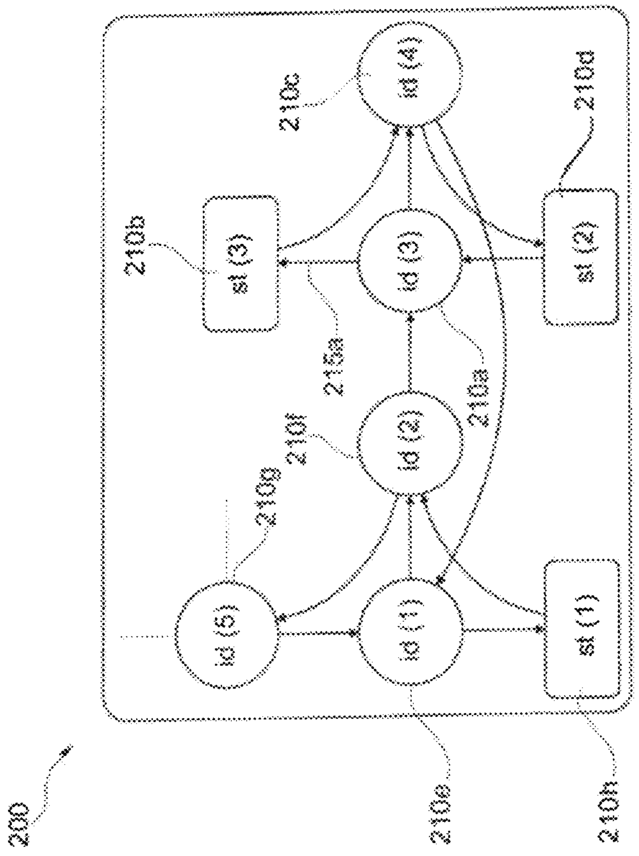
FIG. 3*d* is an illustration of an environment model of the warehouse in FIG. 3*c;*

As will be described in detail below with further reference to FIGS. 3*a-f*, the communication interface 126 of the transport robot 120*a* in the form of an industrial truck is configured to receive an environment model of the warehouse (environment models 200 of a warehouse are illustrated by way of example in FIGS. 3*b* and 3*d*) and a capability model of the plurality of transport robots 120*a,b* in the warehouse. In one embodiment, the communication interface 126 of the transport robot 120*a* is configured to receive the environment model 200 of the warehouse and the capability model of the plurality of transport robots 120*a,b* in the warehouse from the central management device 110. In an additional embodiment, the communication interface 126 of the transport robot 120*a* is configured to receive the environment model 200 of the warehouse and the capability model of the plurality of transport robots 120*a,b* from another transport robot, e.g. the transport robot 120*b*, of the plurality of transport robots.

As described in greater detail below, the environment model 200 of the warehouse defines a plurality of unambiguous key points 210*a-c* (hereinafter also referred to as semantic key points 210*a-c* or nodes 210*a-c*) of the warehouse in the form of a topological map. FIGS. 3*a* and 3*c* each show a detail of a warehouse with key points, and FIGS. 3*b* and 3*d* each show the corresponding environment model 200. As can be seen in particular in FIG. 3*d*, each key point 210*a-h* has at least one neighboring key point, i.e. one connected by means of an edge of the topological map. For example, in the environment model 200 shown by way of example in FIG. 3*d*, the key point 210*a* is connected by one edge 215*a* with the key point 210*b*.

As described in greater detail below, the capability model of the plurality of transport robots 120*a,b* defines or comprises for each of the key points 210*a-h* of the environment model 200, i.e. of the topological map 200, movement sequence data 220*a,b*, in particular at least one trajectory 220*a,b*, for an automated movement from the corresponding key point to the at least one neighboring key point or for the handling of pallets (automatic deposition or pickup). In other words, the capability model with the movement sequence data 220*a,b*, in particular trajectories 220*a,b*, for each key point 201*a-c* of the environment model 200 enables the transport robot 120*a* to connect neighboring key points of the environment model 200 with one another.

In one embodiment, the central management device 110 is configured to generate the environment model 200 of the warehouse and the capability model of the plurality of transport robots 120*a,b* configured as industrial trucks and to make it available to the transport robots 120*a,b* in the form of industrial trucks. In an additional embodiment, the plurality of transport robots can generate the environment model of the warehouse and the capability model in a distributed manner. In one embodiment, the environment model 200 of the warehouse and in particular the capability model of the plurality of transport robots 120*a,b* are based on imitation knowledge collected in the warehouse, which can advantageously be used in particular for the setup of a new transport robot in the warehouse.

According to the invention, the control unit 123 of the transport robot 120*a* is configured to carry out the transport order from a starting key point 220*a* to a destination key point 220*c* of the plurality of key points (210*a-c*), to automatically control the movement of the industrial truck 120*a* on the basis of the environment model 200 and first movement sequence data 220*a*, in particular of a first trajectory 220*a*, and at least second movement sequence data 220*b*, in particular of at least a second trajectory 220*b*, of the capability model, wherein the first movement sequence data 220*a*, in particular the first trajectory 220*a*, defines a movement from the starting key point 210*a* to an intermediate key point 210*b* neighboring the starting key point 210*a* and wherein the at least second movement sequence data 220*b*, in particular the at least second trajectory 220*b*, defines a movement from the intermediate key point 210*b* to the destination key point 210*c* or a movement from the intermediate key point 210*b* to an additional intermediate key point neighboring the intermediate key point 210*b*.

In the example illustrated in FIG. 3*c*, the transport robot 120*a* according to the invention moves in an automated manner on the basis of a first trajectory 220*a* to a first key point provided with a first optical marking 230*a*. Then the transport robot 120*a* according to the invention is moved in an automated manner on the basis of a second trajectory 220*b* with a curve to the right from the first key point to a second key point provided with a second optical marking 230*b* to continue automated travel on the basis of a third trajectory 220*c*. As will be apparent to a person skilled in the art, the second trajectory 220*b* shown by way of example in FIG. 3*c*, which is part of the capability model, is linked with the first key point defined by the environment model, which is provided with the first marking 230*a*. Of course, the first key point defined by the environment model 200 can also be linked with additional trajectories or movement sequence data of the capability model, for example with a trajectory which in the example illustrated in FIG. 3*c* describes a curve to the left.

For each key point of the plurality of key points 210*a-h* of the environment model 200, according to one embodiment the movement information 220*a,b*, in particular the at least one trajectory 220*a,b* of the capability model (which are linked with the corresponding key point) is based on at least one movement learned by imitation learning of an at least one transport robot operated at least partly manually, i.e. by an employee, of the plurality of transport robots 120*a,b* between the key point and the at least one neighboring key point. In other words, during the manual operation of the transport robots 120*a,b* in a warehouse, movement sequence data, in particular trajectories, can be recorded and collected to generate or to expand/update the capability model.

As will be apparent to the person skilled in the art, the environment model 200 and the capability model therefore define an annotated topological map of the warehouse with a plurality of key points 210*a-h* connected with one another, whereby by means of the capability model with each key point 210*a-h* movement sequence data, e.g. at least one trajectory 220*a-c*, of the capability model is concatenated for the movement to at least one neighboring key point. This movement sequence data 220*a-c* of the capability model can, as described above, define or comprise a trajectory for the description of necessary travel commands to reach the neighboring key points, as well as other types of movement sequence data that describe more complex movements, for example for the deposition or pickup of pallets, the loading of the transport robot etc.

As described above, the transport robot 120*a* further comprises a control unit 123 which is configured to carry out a transport order from a starting key point to a destination key point of the plurality of key points 210*a-h*, to automatically control the movement of the transport robot 120*a* on the basis of the environment model 200 and of the capability model. According to one embodiment of the invention, therefore, the expert knowledge or know-how required for the automatic operation of the transport robot 120*a* is transmitted to the transport robot 120*a* in the form of the environment model 200 and as imitation knowledge in the form of the capability model. The transport robot 120*a* in the form of an industrial truck 120*a* and the system 100 thereby provide a mapping of automated goods transport by imitation. The location and handling information required for this purpose can be generated concurrently by the observation of previously executed movements of a transport robot 120*b* configured in the form of an industrial truck (which can be identical or similar to the transport robot 120*a*) controlled manually (i.e. by a human being with expert knowledge, e.g. a warehouse employee), so that this information can be used for the generation or updating of the capability model. In this context concurrency describes an exploration phase of the plurality of transport robots 120*a,b* in the form of industrial trucks that automatically learn, by observation of the field of application during routine work, of all the movements executed and their geographic reference in the warehouse.

According to one embodiment of the invention, therefore, in the exploration phase, imitation knowledge in the form of environment knowledge can be learned automatically by observation of manual transports with the transport robots 120*a,b* in the form of industrial trucks. During the demonstration, for this purpose, as described above, the environment model 200 of the warehouse is generated in the form of a topological map 200, which is based on a plurality of semantic key points 210*a-h* of the warehouse. According to one embodiment, the semantic key points 210*a-h* may be considered for the transport of the goods 140 as locations of basic decisions in the warehouse in order to achieve the desired goal of automated transport orders. In addition to the information contained in the environment model 200, in addition, as described above, the capability model can also be learned, which is used for the concatenation between the previously observed semantic key points 210*a-h*.

In a subsequent exploitation phase, the imitation knowledge can be concatenated with the aid of AI-based handling planning with specific transport orders, so that the previously demonstrated manual transport operations can be carried out automatically. Potential disruptions in the execution of the learned movements caused by faults intrinsic to the system or dynamic obstacles can be compensated for, for example, by an adapted state-lattice-path planner. The localization required for the execution of automatic movements in the space can be based on a proximity-based localization approach which, for metrically continuous localization requirements utilizes the concatenation of the nodes 210*a-h* of the environment model 200 (i.e. of the key points 210*a-h*) via the capability model, and thus does not require a singular reference point, such as a coordinate point of origin in metric maps.

According to one embodiment, each key point of the plurality of key points 210*a-h* can have an artificial marking 230*a,b*, as described above in connection with FIGS. 3*a* and 3*c*. A respective marking 230*a,b* is thereby configured so that it can be detected with the sensor unit 130*a*, in particular a camera 130*a* of the transport robot 120*a* in the form of an industrial truck, to identify the respective key point on the basis of the detected marking 230*a,b*. According to one embodiment, the sensor unit 130*a* can comprise, in addition to a camera, in particular a depth sensing camera, an infrared light source for the illumination of the field of view of the depth sensing camera.

In one embodiment, the control unit 123 of the transport robot 120*a* in the form of an industrial truck is configured to determine, on the basis of the marking 230*a,b* detected by the sensor unit 130*a* of a respective key point the position, in particular the pose of the transport robot 120*a* in the form of an industrial truck relative to the respective key point.

Figure 3E:
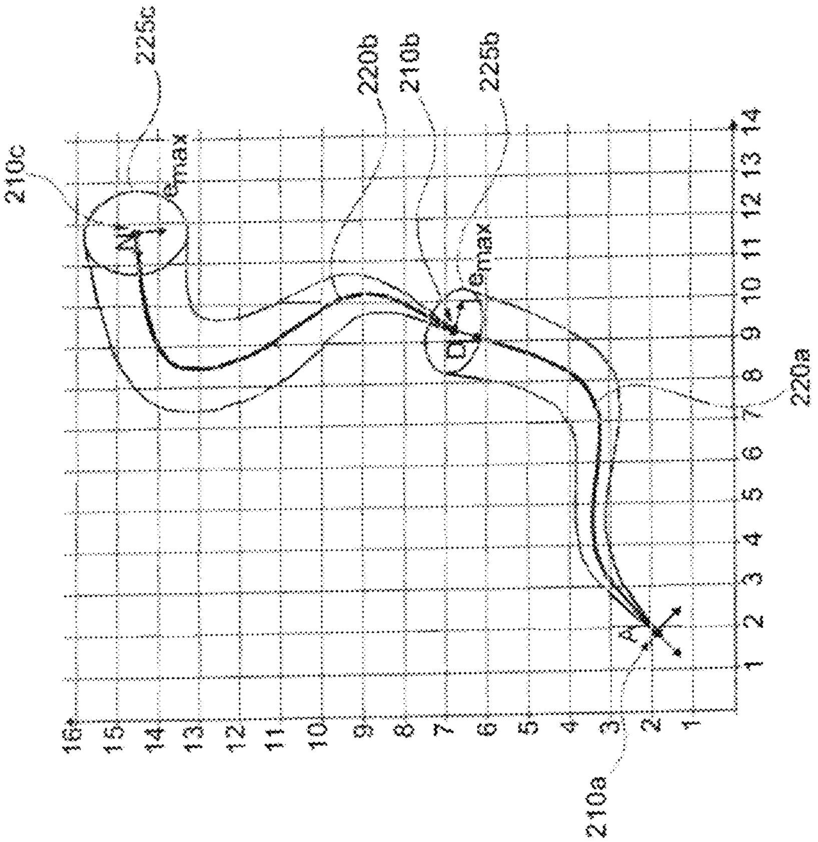
FIG. 3*e* is an illustration of the movement of a transport robot according to one embodiment on the basis of the capability model from a starting key point via an intermediate key point to a destination key point.
Figure 3F:
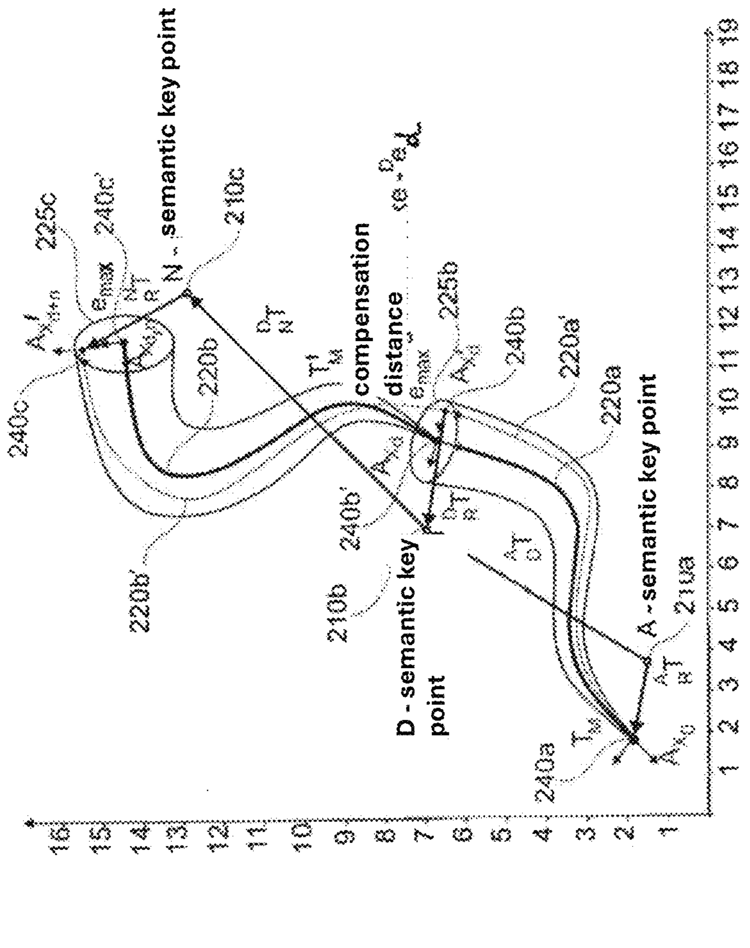
FIG. 3*f* illustrates an automated correction of the movement in FIG. 3*e* by a transport robot according to one embodiment.

FIG. 3*e* illustrates the movement of the transport robot 120*a* according to one embodiment on the basis of the capability model from a position at a starting key point 210*a* via a position at an intermediate key point 210*b* to a position at a destination key point 210*c* of the environment model 200. FIG. 3*f* illustrates an automated correction of the movement in FIG. 3*e* by a transport robot 120*a* according to one embodiment, as will be described in greater detail below.

In the example illustrated in FIG. 3*e*, the control unit 123 of the transport robot 120*a* in the form of an industrial truck is configured to carry out the transport order from the starting key point 210*a* to the destination key point 210*c* of the plurality of key points 210*a-c*, to automatically control the movement of the transport robot 120*a* in the form of an industrial truck on the basis of the environment model 200 and first movement sequence data 220*a*, in particular of a first trajectory 220*a*, and at least second movement sequence data 220*b*, in particular of at least one second trajectory 220*b*, of the capability model. The first movement sequence data 220*a*, in particular the first trajectory 220*a*, defines a movement from the starting key point 210*a* to an intermediate key point 210*b* neighboring the starting key point 210*a*, and the at least second movement sequence data 220*b*, in particular the at least one second trajectory 220*b*, defines a movement from the intermediate key point 210*b* to the destination key point 210*c*. According to one embodiment, the control unit 123 of the transport robot 120*a* can further be configured, by means of a cost function, to determine the movement of the transport robot 120*a* in the form of an industrial truck from the starting key point 210*a* to the destination key point 210*c* via the one or more intermediate key points 210*b* lying between them. For example, the control unit 123 can determine, on the basis of the cost function, a route from the starting key point 210*a* to the destination key point 210 via one or more intermediate key points 210*b* lying between them, which minimizes the travel time or travel distance of the transport robot 120*a*.

As can be seen in particular in FIG. 3*f*, in one embodiment the control unit 123 of the transport robot 120*a* in the form of an industrial truck is further configured, after the movement of the transport robot 120*a* in the form of an industrial truck from the starting key point 210*a* to the intermediate key point 210*b*, which is based on the first movement sequence data 220*a*, in particular on the first trajectory 220*a* of the capability model, to determine a cumulative deviation of a current position or current pose 240*b* from a specified position or specified pose 240*b*' of the transport robot 120*a* in the form of an industrial truck relative to the intermediate key point 210*b*. As illustrated in FIG. 3*f* and described in greater detail below, the control unit 123 of the transport robot 120*a* according to one embodiment is configured to vary the movement of the transport robot 120*a* from the intermediate key point 210*b* to the destination key point 210*c*, which takes place on the basis of the specified trajectory 220*b*, in order to counteract the cumulative deviation at the intermediate key point 210*b*, which can be considered the integral error propagation.

According to one embodiment, the control unit 123 of the transport robot 120*a* is configured to counteract the integral error propagation illustrated in FIG. 3*f* during the movement to the intermediate key point 210*b* by the correction of the localization (proximity-based) at the intermediate key point 210*b*. For this purpose, in addition to the movement sequence data 220*a*, in particular the trajectory 220*a* for the movement to the intermediate key point 210*b*, the position of the intermediate key point 210*b* relative to the starting key point 210*a* can be stored in the environment model 200 (for example in the form of metadata) and used for the error correction.

According to one embodiment, the position of the starting key point 210*a* is used as a reference point for the realization of a metric localization for the individual mission. As soon as, in the further course of the automated movement of the transport robot 120*a*, expected nodes of the environment model 200 are reached, for example the intermediate key point 210*b*, these nodes can be used as correction variables on account of their known concatenated geometric relationship to the starting key point 210*a*. According to one embodiment, all relevant geometric relationships of the key points 220*a-c* can be taken from the topological map 200, i.e. from the environment model 200.

As described above, in the example illustrated in FIG. 3*f*, the movement of the transport robot 120*a* starts in the vicinity of the starting key point 210*a* (also designated node A in FIG. 3*f*), which is used as a reference point, and proceeds via the intermediate key point 210*b* (also designated node D in FIG. 3*f*) to the destination key point 210*c* (also designated node N in FIG. 3*c*). Therefore, the transport robot 120*a* starts its planned first trajectory 220*a* (i.e. the first specified trajectory 220*a*), which is part of the capability model, at the reference point A. On the assumption that the tracking of the first trajectory 220*a*, which maps the connection between the starting key point 220*a* (point A) and the intermediate key point 220*b* (point D), has no initial misalignment, the first actual trajectory 220*a*' starts with the same pose as the planned first trajectory 220*a*. Because the localization of the semantic key point can be geographically limited, in one embodiment the location uses, in the further tracking of the movement of the transport robot 120*a*, odometry signals from the transport robot 120*a*. The odometry signals can generate a random error during the movement, resulting in the deviation illustrated in FIG. 3*f* between the specified trajectory 220*a* and the actual trajectory 220*a'*.

According to one embodiment, a successful localization depends on the cumulative error (hereinafter designated $e_k$) at the end of the movement along a trajectory of the capability model permitting a recognition of the next node. The ellipses 225*b* and 225*c* shown in FIG. 3*f* define this destination area, in which the sensory localization is possible, for the intermediate key point 210*b* and the destination key point 210*c*. When the destination area 250*b* is reached at the end of the movement from the starting key point 210*a* to the intermediate key point 210*b*, the intermediate key point 210*b* is used as a new reference point. The actual error can be calculated by the recognition of the intermediate key point 210*b* by the transport robot 120*a*. The error between the planned specified trajectory 220*a* and the actual trajectory 220*b* results from the difference between the expected Pose? and the measured Pose according to the following equation:

$${}^{D}e_d = {}^{D}x_d - {}^{D}x'_d \text{ with } {}^{D}x_d = ({}^{A}_{D}T)^{-1} \cdot {}^{A}x_d$$

With the error $e_d$ determined in this manner, at the intermediate key point 201*b* at the time d, according to one embodiment, this error can be compensated for, to adjust the movement of the transport robot 120*a* back to a planned specified movement. On account of the non-holonomic properties of a plurality of transport robots, according to one embodiment, the compensation for the determined error is made by a compensation trajectory with an individual length. The path required for this purpose is represented in FIG. 3*f* as the broken-line portion of the actual trajectory 220*b*'. Therefore, the current cumulative error can be fully compensated for by the control unit 123 of the transport robot 120*a*.

As the transport robot 120*a* continues to move from the intermediate key point 210*b* to the destination key point 210*c*, an error can again occur (in particular on account of erroneous odometry signals), as soon as the transport robot 120*a* leaves the sensory node detection of the intermediate key point 210*b*. Until reaching the sensory perception of the destination key point 210*c*, the localization error, as during the movement from the starting key point 210*a* to the intermediate key point 210*b*, can now also increase during the current movement to the destination key point 210*c*. The error e can be recalculated as soon as the transport robot 120*a* enters the sensory detection range 225*c* of the destination key point 210*c*. For the overall movement from the starting key point 210*a* to the destination key point 210*c*, that means that the previously calculated error corrections make it possible to reach the next key point, if the transport robot 120*a* does not leave the maximum allowable error ellipse 225 (designated emax in FIG. 3*f*).

The generally derived calculation requirement for the determination of the error $e_k$ at the key point c and at the time k results from the concatenation of the nodes in the topological map 200 according to the following equation:

$${}^{c}e_k = {}^{c}x_k - {}^{c}x'_k \text{ with } {}^{c}x_k = \left(\prod_{i=S}^{c} ({}^{i}_{i+1}T)^{-1}\right) \cdot {}^{S}x_k$$

The index S in the above equation corresponds in this context corresponds to the starting point of the movement of the transport robot at the starting key point 210*a*, while c represents the next expected key point. The notation $Sx_k$ corresponds to the current odometry-supported, error-corrected pose of the transport robot 120*a* at the discrete time k in the starting coordinate system.

As the person skilled in the art knows, according to the invention the number of mission nodes, i.e. key points, plays no role in a successful localization. Only the relative pose between the neighboring nodes is necessary for the correction of the localization. In addition, the sensory detection of the nodes by the transport robot 120*a* must be possible to be able to calculate their relative pose.

The mapping of the environment of a warehouse according to the invention stored in the form of a topological map or environment model has the immediate advantage that the location information can be stored in the form of a discrete planning network. This discrete planning network represents by means of its edges all the potential connections that the transport robot 120*a* can execute. The topological map can also unite the environment model 200 and the (learned) capabilities for the concatenation of neighboring nodes. The topological maps therefore fundamentally expand the geometric-semantic approach of current map models by the integration of a capability model. The capability model is used as a metric link between the nodes of the environment model 200. As a result of the connection of a plurality of nodes, a kinematic chain is formed which interrupts the accumulating unknown localization error at the node points (semantic key points), because the positions of the sensed nodes dare environmentally invariant. Initially, two important deductions result from this observation.

Integral localization errors that result from external factors such as slip, malfunctioning sensor systems, digital losses etc. can be limited in their effects on the sensed nodes. Therefore, the annotated, topological maps described here minimize the risk of an invalid community map, as it is automatically learned and expanded by a fleet of transport robots. The map itself can thereby be replaced without further action.

The mappable geometric length of the trajectories of the capability model for the connection of the nodes is dependent only on the transport robot sensor system used and can further be expanded to include sensory post-processing steps (e.g. visual odometry).

In an additional possible configuration, to restrict the resulting incremental error, which increases with increasing distance from the passed node point, a relative supporting localization can be used, e.g. with the aid of methods of visual odometry as well as colored roadway markings, curb stones etc. The distance between the supporting points in a warehouse can therefore be increased.

An additional advantage results from the mapping of logical information of the nodes perceived visually if they have a direct mapping reference to the inventory management. In this case, the inventory management can work directly with the node information, so that the complex transfer of logical information of the inventory management into geometric information of the transport robot 120*a,b* is no longer necessary.

Figure 4:
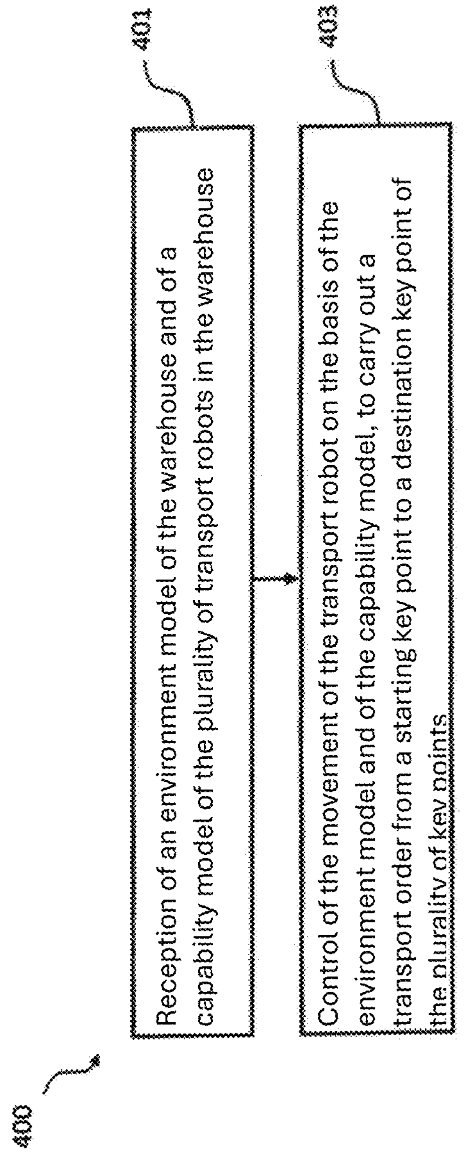
FIG. 4 is a flow diagram showing the steps of a method for the operation of a transport robot for the transport of goods in a warehouse according to one embodiment.

FIG. 4 shows a flow diagram with steps of a method 400 for the operation of a transport robot 120*a* in the form of an industrial truck, to carry out transport orders for the transport of goods 140 in a warehouse with a plurality of transport robots 120*a,b* in the form of industrial trucks. The method 400 comprises a step 401 of the reception of an environment model 200 of the warehouse and of a capability model of the plurality of transport robots 120*a,b* in the warehouse (optionally from the central device 110 for the operation of the plurality of transport robots). As described in detail above, the environment model 200 of the warehouse defines a plurality of key points 210*a-c* of the warehouse, and for each key point at least one neighboring key point, and the capability model defines for each of the key points 210*a-c* of the environment model, movement sequence data 220*a,b*, in particular at least one trajectory 220*a,b*, for an automated movement to the at least one neighboring key point. The method 400 further comprises a step 403 of the control of the movement of the transport robot 120*a* to carry out a transport order from a starting key point 220*a* to a destination key point 210*c* of the plurality of key points 210*a-c* on the basis of the environment model 200 and first movement sequence data 220*a*, in particular of a first trajectory and at least second movement sequence data 220*b*, in particular of at least one second trajectory 220*b*, of the capability model, wherein the first trajectory 220*a*, defines a movement from the starting key point 210*a* to an intermediate key point 210*b* neighboring the starting key point 210*a* and wherein the at least second movement sequence data 220*b*, in particular the at least one second trajectory 220*b*, defines a movement from the intermediate key point 210*b* to the destination key point 210*c* or a movement from the intermediate key point 210*b* to an additional intermediate key point neighboring the intermediate key point 210*b*.

The method 400 according to the invention can be carried out by means of the transport robot 120*a* in the form of an industrial truck. Therefore, additional embodiments of the method 400 according to the invention can be derived from the embodiments of the transport robot 120*a* according to the invention described above.

The invention claimed is:

1. A transport robot to carry out transport orders for transport of goods in a warehouse with a plurality of transport robots, the transport robot comprising:

a communication interface configured to receive an environment model of the warehouse and a capability model of the plurality of transport robots in the warehouse, wherein the environment model of the warehouse defines a plurality of key points of the warehouse and, for each key point, at least one neighboring key point, and wherein the capability model defines for each of the key points of the environment model, movement sequence data comprising at least one trajectory for an automated movement to the at least one neighboring key point; and a control unit to carry out a transport order from a starting key point to a destination key point of the plurality of key points, and configured to control movement of the transport robot on the basis of the environment model and first movement sequence data comprising a first trajectory and at least second movement sequence data comprising at least a second trajectory of the capability model, wherein the first movement sequence data comprising the first trajectory defines a movement from the starting key point to an intermediate key point neighboring the starting key point, and wherein the at least second movement sequence data comprising the at least one second trajectory defines a movement from the intermediate key point to a destination key point or a movement from the intermediate key point to an additional intermediate key point neighboring the intermediate key point wherein the control unit is further configured, after movement of the transport robot from the starting key point to the intermediate key point on the basis of a first movement sequence data comprising the first trajectory, to determine a deviation of a current position or current pose from a specified position or specified pose of the transport robot relative to the intermediate key point and to vary the movement of the transport robot from the intermediate key point to the destination key point or the additional intermediate key point neighboring the intermediate key point on the basis of the second movement sequence data comprising the at least one second trajectory to counteract the deviation.

2. The transport robot according to claim 1, wherein, for each key point of the plurality of key points of the environment model, the movement sequence data comprising at least one trajectory of the capability model is based on at least one movement learned by imitation learning of a transport robot operated manually of the plurality of transport robots between the key point and the at least on neighboring key point.

3. The transport robot according to claim 1, wherein the control unit is further configured, by means of a cost function, to determine movement of the transport robot from the starting key point to the destination key point via the one or more intermediate key points lying between the starting key point and the destination key point.

4. The transport robot according to claim 1, wherein each key point of the plurality of key points has a marking, and wherein the transport robot further comprises a sensor unit, which is configured to detect the marking of a respective key point and to identify the respective key point on the basis of the detected marking.

5. The transport robot according to claim 4, wherein the control unit is configured, on the basis of the marking detected by the sensor unit of a respective key point, to determine a position of the transport robot relative to the respective key point.

6. The transport robot according to claim 4, wherein the marking is a visual marking, and wherein the sensor unit comprises a depth sensing camera for detection of the visual marking.

7. The transport robot according to claim 1, wherein the transport robot further comprises a drive unit which is configured to drive movement of the transport robot on the basis of movement control signals from the control unit.

8. The transport robot according to claim 1, wherein the transport robot is in the form of an industrial truck.

9. A system for operation of a plurality of transport robots in a warehouse, the system comprising:

a plurality of transport robots according to claim 1; and a central device for the operation of the plurality of transport robots in the warehouse, wherein the central device is configured to make available to a transport robot of the plurality of transport robots the environment model of the warehouse and the capability model of the transport robots.

10. A method for operation of a transport robot to carry out transport orders for transport of goods in a warehouse with a plurality of transport robots, the method comprising:

receiving an environment model of the warehouse and a capability model of the plurality of transport robots in the warehouse, wherein the environment model of the warehouse defines a plurality of key points of the warehouse and, for each key point, at least one neighboring key point, and wherein the capability model defines for each of the key points of the environment model movement sequence data comprising at least one trajectory for an automated movement to the at least one neighboring key point; and controlling movement of the transport robot to carry out a transport order from a starting key point to a destination key point of the plurality of key points on the basis of the environment model and first movement sequence data comprising a first trajectory, and at least second movement sequence data comprising at least a second trajectory of the capability model, wherein the first movement sequence data defines a movement from the starting key point to an intermediate key point neighboring the starting key point, and wherein the at least second movement sequence data comprising the at least second trajectory defines a movement from the intermediate key point to the destination key point or a movement from the intermediate key point to an additional intermediate key point neighboring the intermediate key point; and after movement of the transport robot from the starting key point to the intermediate key point on the basis of a first movement sequence data comprising the first trajectory, determining a deviation of a current position or current pose from a specified position or specified pose of the transport robot relative to the intermediate key point and varying the movement of the transport robot from the intermediate key point to the destination key point or the additional intermediate key point neighboring the intermediate key point on the basis of the second movement sequence data comprising the at least one second trajectory to counteract the deviation.

* * * * *